US009111500B2

(12) United States Patent
Al-Dahle et al.

(10) Patent No.: US 9,111,500 B2
(45) Date of Patent: Aug. 18, 2015

(54) DEVICES AND METHODS FOR PIXEL DISCHARGE BEFORE DISPLAY TURN-OFF

(75) Inventors: Ahmad Al-Dahle, Santa Clara, CA (US); Brian J. Conner, San Jose, CA (US); Hopil Bae, Sunnyvale, CA (US); Yafei Bi, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 303 days.

(21) Appl. No.: 13/451,389

(22) Filed: Apr. 19, 2012

(65) Prior Publication Data

US 2013/0278581 A1 Oct. 24, 2013

(51) Int. Cl.
*G06F 3/038* (2013.01)
*G09G 3/36* (2006.01)

(52) U.S. Cl.
CPC ...... *G09G 3/3648* (2013.01); *G09G 2310/0251* (2013.01); *G09G 2310/061* (2013.01); *G09G 2310/063* (2013.01); *G09G 2320/0204* (2013.01); *G09G 2320/0247* (2013.01); *G09G 2320/0257* (2013.01); *G09G 2320/046* (2013.01); *G09G 2330/027* (2013.01)

(58) Field of Classification Search
CPC . G09G 3/3696; G09G 3/3648; G09G 3/3688; G09G 2310/0245; G09G 2320/046; G09G 2330/02–2330/022; G09G 2330/027; G09G 2310/0251; G09G 2310/061; G09G 2310/063; G09G 2320/0204; G09G 2320/0247; G09G 2320/0257
USPC ......... 345/87, 211–214, 204; 713/1, 300–340
See application file for complete search history.

(56) References Cited

U.S. PATENT DOCUMENTS

| | | | | |
|---|---|---|---|---|
| 5,638,541 | A * | 6/1997 | Sadashivaiah | 713/323 |
| 6,089,453 | A | 7/2000 | Kayser | |
| 6,104,367 | A | 8/2000 | McKnight | |
| 6,115,824 | A * | 9/2000 | Ha | 713/330 |
| 6,343,196 | B1 * | 1/2002 | Yun et al. | 399/81 |
| 7,155,604 | B2 | 12/2006 | Kawai | |
| 7,271,801 | B2 * | 9/2007 | Toyozawa et al. | 345/211 |
| 7,428,633 | B2 * | 9/2008 | Park et al. | 713/1 |
| 7,489,355 | B2 | 2/2009 | Lee et al. | |
| 7,861,007 | B2 | 12/2010 | Aleksic | |
| 7,928,974 | B2 * | 4/2011 | Toyozawa et al. | 345/211 |
| 2001/0020928 | A1 * | 9/2001 | Yanagisawa et al. | 345/98 |
| 2003/0189564 | A1 * | 10/2003 | Lee et al. | 345/212 |
| 2006/0152572 | A1 * | 7/2006 | Kasai | 347/130 |
| 2007/0152993 | A1 * | 7/2007 | Mesmer et al. | 345/211 |
| 2007/0153007 | A1 * | 7/2007 | Booth et al. | 345/501 |
| 2007/0195038 | A1 * | 8/2007 | Kida et al. | 345/87 |
| 2008/0165099 | A1 * | 7/2008 | Cho et al. | 345/87 |
| 2009/0085902 | A1 * | 4/2009 | Yamamoto et al. | 345/211 |
| 2010/0097365 | A1 * | 4/2010 | Fang et al. | 345/212 |

* cited by examiner

*Primary Examiner* — Rodney Amadiz
(74) *Attorney, Agent, or Firm* — Fletcher Yoder PC

(57) ABSTRACT

Methods and devices employing circuitry for quickly discharging pixels of a display before the display is turned off are provided. In one example, a method may include receiving at the electronic display a signal indicating the electronic display will be powered off within a period of time. The method may also include, in response to the signal, causing a frame of pixel data originating from the electronic display to be stored in pixels of the electronic display before the electronic display is powered off. Storing the frame of pixel data in the pixels may inhibit image artifacts from occurring on the electronic display when the electronic display is powered back on in the future.

17 Claims, 6 Drawing Sheets

DEVICES AND METHODS FOR PIXEL DISCHARGE BEFORE DISPLAY TURN-OFF

BACKGROUND

The present disclosure relates generally to electronic displays and, more particularly, to liquid crystal displays (LCDs) that can discharge pixels of the LCD before the LCD is turned off to decrease image artifacts from occurring on the LCD when the LCD is powered back on at a later time.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic displays, such as liquid crystal displays (LCDs), are commonly used in electronic devices such as televisions, computers, and phones. LCDs portray images by modulating the amount of light that passes through a liquid crystal layer within pixels of varying color. For example, by varying a voltage difference between a pixel electrode and a common electrode in a pixel, an electric field may result. The electric field may cause the liquid crystal layer to vary its alignment, which may ultimately result in more or less light being emitted through the pixel where it may be seen. By changing the voltage difference (often referred to as a data signal) supplied to each pixel, images may be produced on the LCD.

To store data representing a particular amount of light that is to be passed through pixels, gates of thin-film transistors (TFTs) in the pixels may be activated while the data signal is supplied to the pixels. Conventionally, when an LCD is turned off by a hard reset, the pixel electrodes of the pixels of the LCD may not be discharged before power is removed from the LCD. Thus, the remaining voltage on the pixels may be different from a desired low voltage and may cause an electric field that remains in place after the LCD is turned off. This electric field may continue to impact the liquid crystal layer of the pixels of the LCD while the LCD is off. It is believed that this electric field caused by the voltage on the pixel electrodes may result in image artifacts, such as flickering, that could appear after the display is turned on again.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for discharging pixels of an electronic display quickly prior to the electronic display being turned off, such as when a hard reset occurs, to store a low voltage in the pixels and to reduce image artifacts from occurring after the display is turned on again. By way of example, a method for preparing an electronic display of an electronic device to be turned off may include receiving at the electronic display a signal indicating the electronic display will be powered off within a period of time. The method may also include, in response to the signal, causing a frame of pixel data originating from the electronic display to be stored in pixels of the electronic display before the electronic display is powered off to inhibit image artifacts from occurring on the electronic display when the electronic display is powered back on in the future.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to liquid crystal displays (LCDs) and electronic devices incorporating LCDs that employ a display shut-down device, method, or combination thereof. Specifically, rather than turning off an electronic display in a conventional manner when a hard reset occurs, which could result in a residual voltage remaining on the pixels of the electronic display—which could in turn cause image artifacts when the display is turned back on—embodiments of the present disclosure may incorporate circuitry for display turn-off that quickly discharges pixels before power is removed from the display.

Specifically, to decrease the amount of residual voltage remaining on the pixels, a signal is sent from a power management unit to the display to indicate that power will be removed from the display after a certain period of time. The certain period of time may be about the same time as, or longer than, the time it takes to quickly store a frame of pixel data originating from the display in pixels of the display. In response to the signal, the display stores a frame of pixel data in pixels of the display (e.g., discharges the pixels). As a result, it is believed that a residual voltage may be less likely to appear on the liquid crystal after the LCD is turned off and, accordingly, image artifacts may be less likely to occur when the LCD is turned back on.

Figure 1:
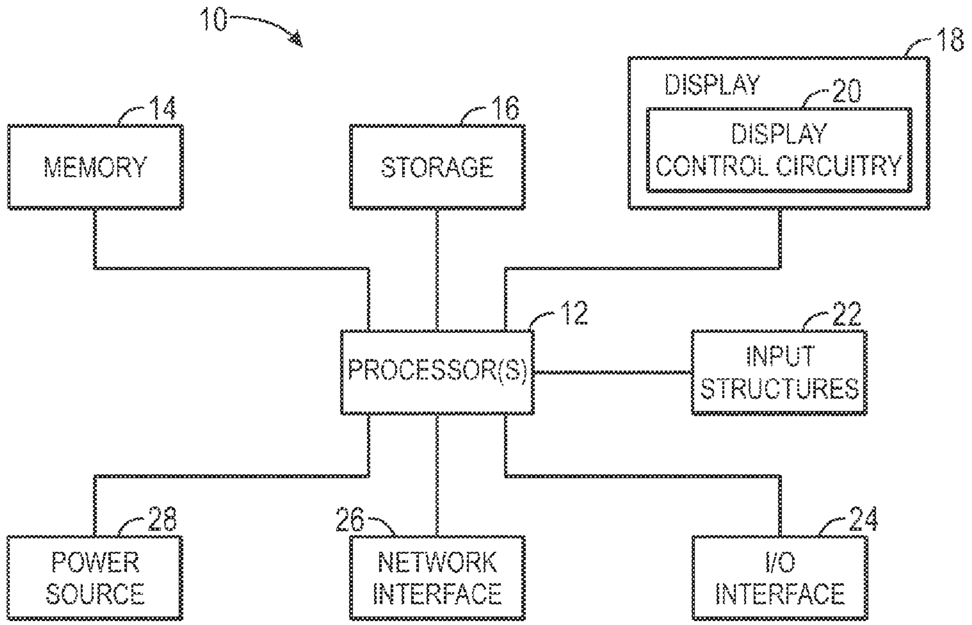
FIG. 1 is a schematic block diagram of an electronic device with a liquid crystal display (LCD) having circuitry for discharging pixels of the display before the display is turned-off by a hard reset to decrease the occurrence of image artifacts when the display is later turned back on, in accordance with an embodiment.
Figure 2:
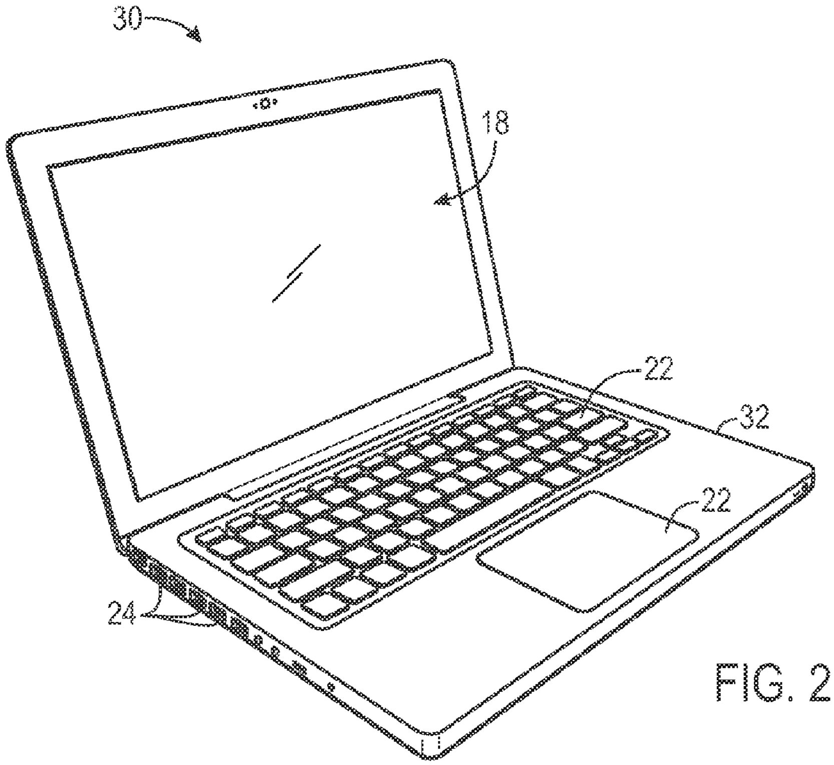
FIG. 2 is a perspective view of a notebook computer representing an embodiment of the electronic device of FIG. 1.
Figure 3:
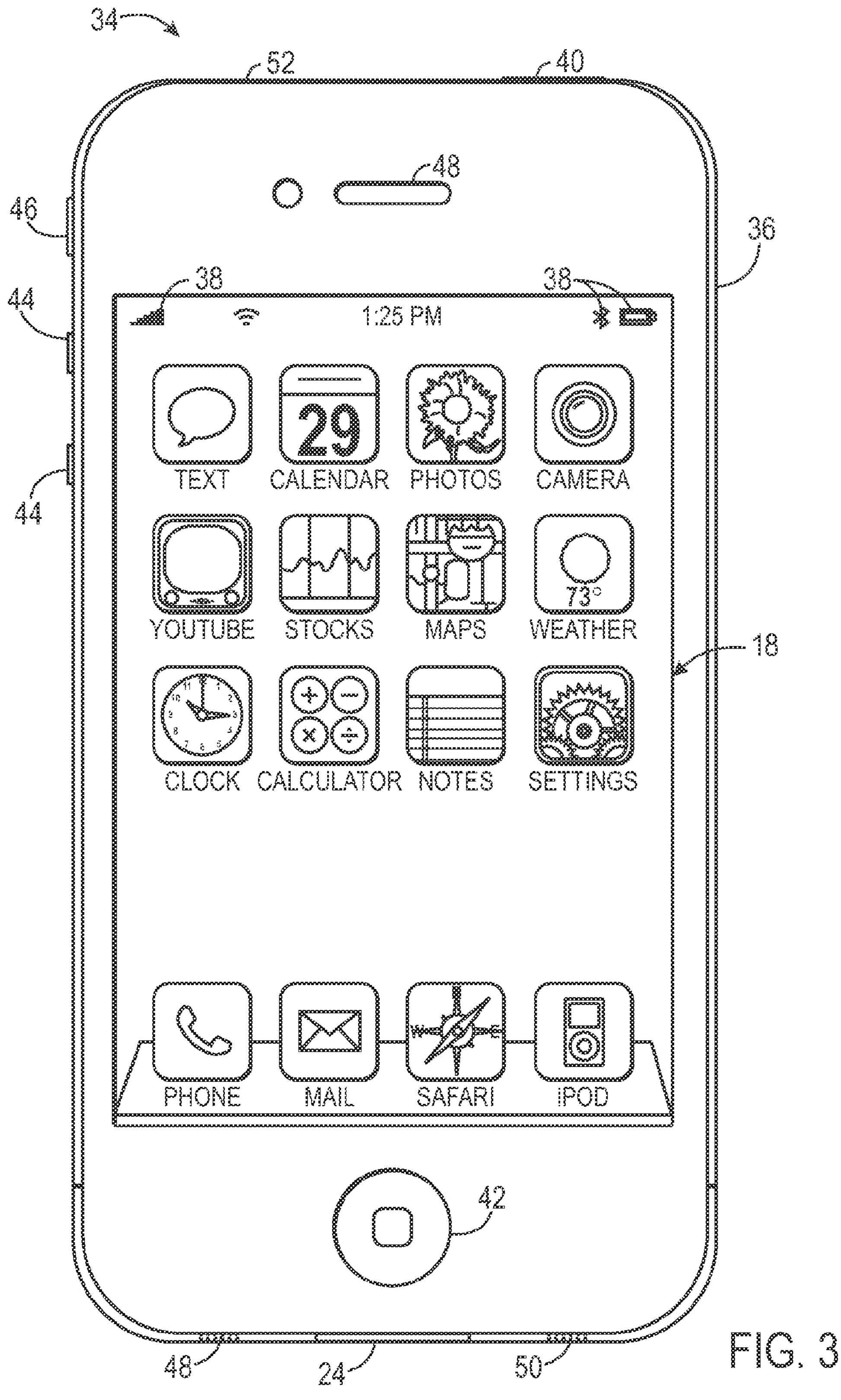
FIG. 3 is a front view of a handheld device representing another embodiment of the electronic device of FIG. 1.

With the foregoing in mind, a general description of suitable electronic devices that may employ electronic displays having capabilities to quickly store a frame of pixel data originating from the display in response to an indication of an upcoming display power off will be provided below. In particular, FIG. 1 is a block diagram depicting various components that may be present in an electronic device suitable for use with such a display. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18 having display control circuitry 20 for quickly discharging pixels before display turn-off, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As will be appreciated, when pixels are not discharged before the display 18 is turned off, a bias voltage may remain on the pixels. It is believed that this bias voltage could affect the liquid crystal, creating image artifacts on the display 18 for a long time (e.g., several minutes) after the display 18 is turned back on. As such, embodiments of the present disclosure may be employed to decrease the occurrence of image artifacts.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the electronic display 18 by determining when the electronic display 18 is to be quickly turned off and by issuing a notification that a turn-off or shutdown will occur within a short period of time. The notification that a turn-off or shutdown will occur is provided to the display 18, which uses the display control circuitry 20 to discharge pixels of the display 18 (e.g., store a frame of black or low voltage pixel data in pixels of the display 18) to reduce the occurrence of image artifacts when the display 18 is later turned back on.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once. As will be described further below, the display control circuitry 20 may include circuitry that receives a signal indicating an imminent reset (e.g., power off) of the display 18 will occur (e.g., occur within a short period of time). The display control circuitry 20 may quickly discharge the pixels of the electronic display 18 prior to the display 18 being reset.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on computer 30. For example, a keyboard and/or touchpad may allow a user to navigate a user interface or application interface displayed on the display 18. Further, the display 18 may include the display control circuitry 20 for quickly discharging pixels of the display 18, such as when the display control circuitry 20 receives an indication that a hard reset has occurred.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 may include the display control circuitry 20 for quickly storing pixel data in the pixels of the display 18 before power is removed from the display 18.

Figure 4:
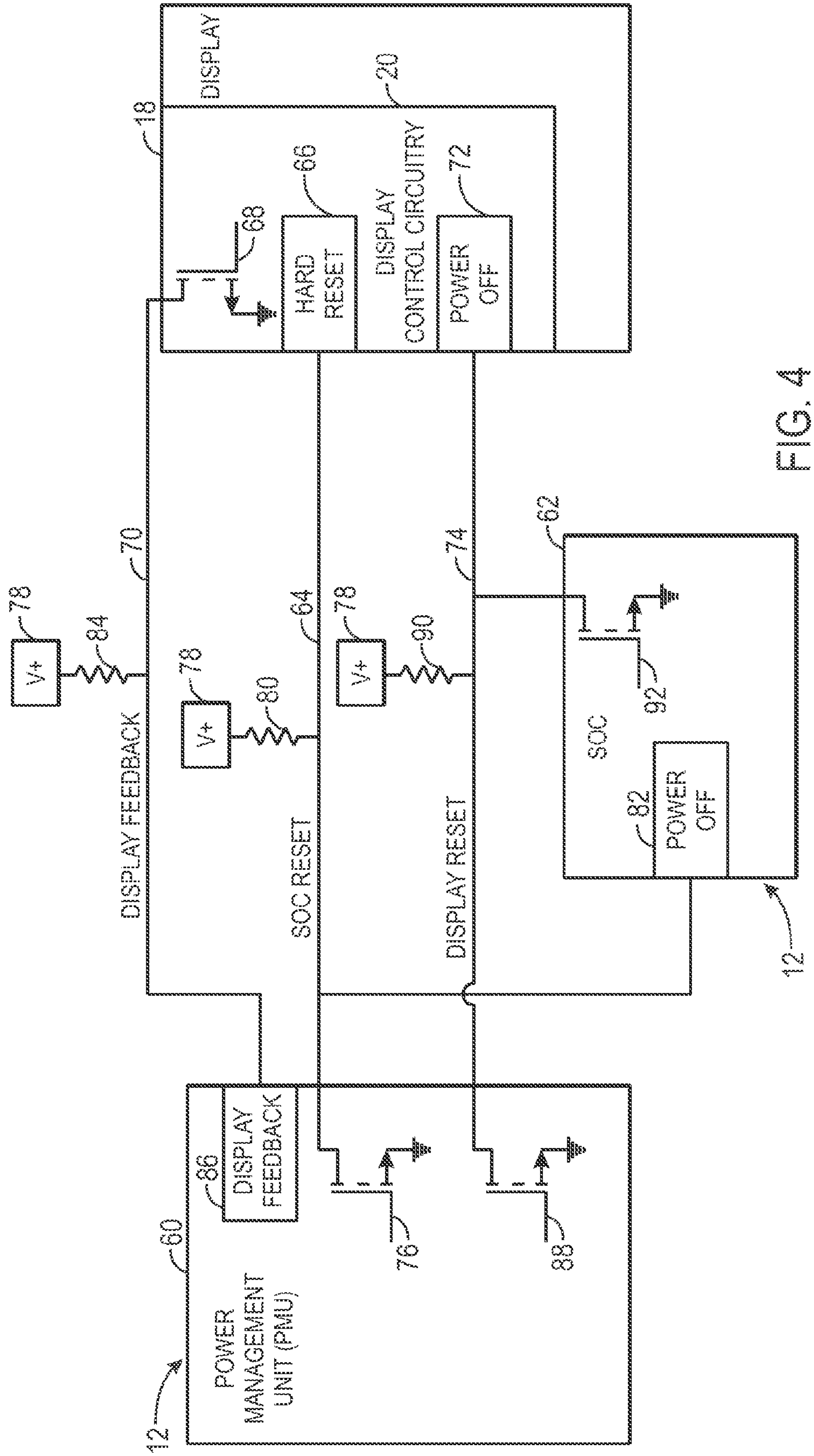
FIG. 4 is a circuit diagram illustrating circuitry of an electronic device used for quickly turning off a display when a hard reset occurs, in accordance with an embodiment.

There are many ways to configure the circuitry of the electronic device 10 so that data may be discharged from pixels of the electronic display 18 after a hard reset occurs, but before power is removed from the display 18. FIG. 4 generally represents one embodiment of a circuit diagram of certain components of the electronic device 10 used for quickly turning off the display 18, such as when a hard reset occurs. In particular, the processors 12 of the electronic device 10 may include a power management unit 60 and a system on a chip (SOC) 62. The power management unit 60 is used to manage the power of the electronic device 10 and may control when power is applied to or removed from other components of the electronic device 10. The SOC 62 is used to manage operations of the electronic device 10, such as controlling data sent to the electronic display 18.

The display 18 includes display control circuitry 20 that is used to quickly discharge pixels after receiving an indication from an SOC reset signal 64 that power will soon be removed from the display 18 in order to decrease the occurrence of image artifacts. Specifically, the display control circuitry 20 includes a hard reset input 66 that is configured to receive the indication from the SOC reset signal 64 that power will soon be removed from the display 18. The display control circuitry 20 also includes software and/or hardware that causes a frame of pixel data originating from the display 18 to be stored in the pixels of the display 18 after the indication from the SOC reset signal 64 that power will soon be removed from the display 18 is received by the hard reset input 66. As may be appreciated, the display control circuitry 20 is configured to cause the frame of pixel data originating from the display 18 to be stored in the pixels of the display 18 before power is removed from the display 18. As such, the frame of pixel data may be written to the pixels quickly, such as within 16-36 ms (e.g., when the display 18 operates at 60 Hz, the display 18 will normally display one frame every 16 ms). The display control circuitry 20 also includes feedback output circuitry 68 that is configured to send a display feedback signal 70 indicating that the frame of pixel data has been stored in the pixels of the display 18. As illustrated, in the present embodiment, the feedback output circuitry 68 may include a FET; however, in other embodiments, the feedback output circuitry 68 may include any suitable output producing device, such as any type of switching device. Further, the display control circuitry 20 includes a power-off input 72 that is configured to receive a display reset signal 74 to cause the display 18 to begin a power-down or power-off sequence.

The power management unit 60 includes SOC reset output circuitry 76 that may be activated, such as when a hardware reset of the electronic device 10 occurs. The SOC reset output circuitry 76 may include a FET as illustrated, or any other suitable output producing device. A voltage source V+ 78 may be coupled to a pull-up resistor 80 which is further coupled to the SOC reset signal 64. The voltage source V+ 78 may be any suitable voltage that can be used to produce an input signal for the power management unit 60, the SOC 62, and/or the display 18, such as approximately 1.8 volts. In the present embodiment, the SOC reset signal 64 is an active-high signal. Therefore, the default output from the SOC reset output circuitry 76 is a logical high. When the SOC reset output circuitry 76 is activated, the SOC reset signal 64 becomes a logical low. The SOC 62 includes a power off input 82 that receives the SOC reset signal 64. When the SOC reset signal 64 is a logical low, the SOC 62 enters a reset mode where it is eventually powered off.

When the hard reset input 66 receives a logical low SOC reset signal 64, the display control circuitry 20 causes a frame of pixel data originating from the display 18 to be stored in the pixels of the display 18. As will be appreciated, the frame of pixel data may be used to discharge the pixels so that there remains substantially no electric field on the liquid crystal, resulting in a decreased occurrence of image artifacts. In other words, the frame of pixel data may be "black" data, zero volts, or near zero volts. After the display control circuitry 20 has caused the frame of pixel data to be stored in the pixels of the display 18, the display control circuitry 20 may activate the feedback output circuitry 68. As illustrated, the voltage source V+78 may be coupled to a pull-up resistor 84, which is further coupled to the display feedback signal 70. The display feedback signal 70 is an active-high signal. Therefore, the default output from the display feedback signal 70 is a logical high. When the feedback output circuitry 68 is activated, the display feedback signal 70 becomes a logical low.

The power management unit 60 includes a display feedback input 86 that receives the display feedback signal 70. When the power management unit 60 receives a logical low display feedback signal 70, the power management unit 60 has a confirmation that the display 18 has caused the pixels of the display 18 to be discharged. The power management unit 60 includes display reset output circuitry 88, which may be activated after the logical low display feedback signal 70 is received. In certain embodiments, the power management unit 60 may activate the display reset output circuitry 88 only after receiving the logical low signal at the display feedback input 86; however, in other embodiments, the power management unit 60 may activate the display reset output circuitry 88 regardless of whether or not a logical low signal was received by the display feedback input 86. For example, the power management unit 60 may wait for a certain period of time after activating the SOC reset output circuitry 76 then automatically activate the display reset output circuitry 88.

The voltage source V+ 72 may be coupled to a pull-up resistor 90 which is further coupled to the display reset signal 74. The display reset signal 74 is an active-high signal. Therefore, the default output from the display reset signal 74 is a logical high. When the display reset output circuitry 88 is activated, the display reset signal 74 becomes a logical low. The power off input 72 of the display control circuitry 20 receives the display reset signal 74. When the power off input 72 receives a logical low display reset signal 74, the display control circuitry 20 has notification that power is being removed from the display 18. In certain circumstances, the SOC 62 may cause power to be removed from the display 18. The SOC 62 may cause power to be removed from the display 18 by activating a display reset output circuitry 92 of the SOC 62.

Figure 5:
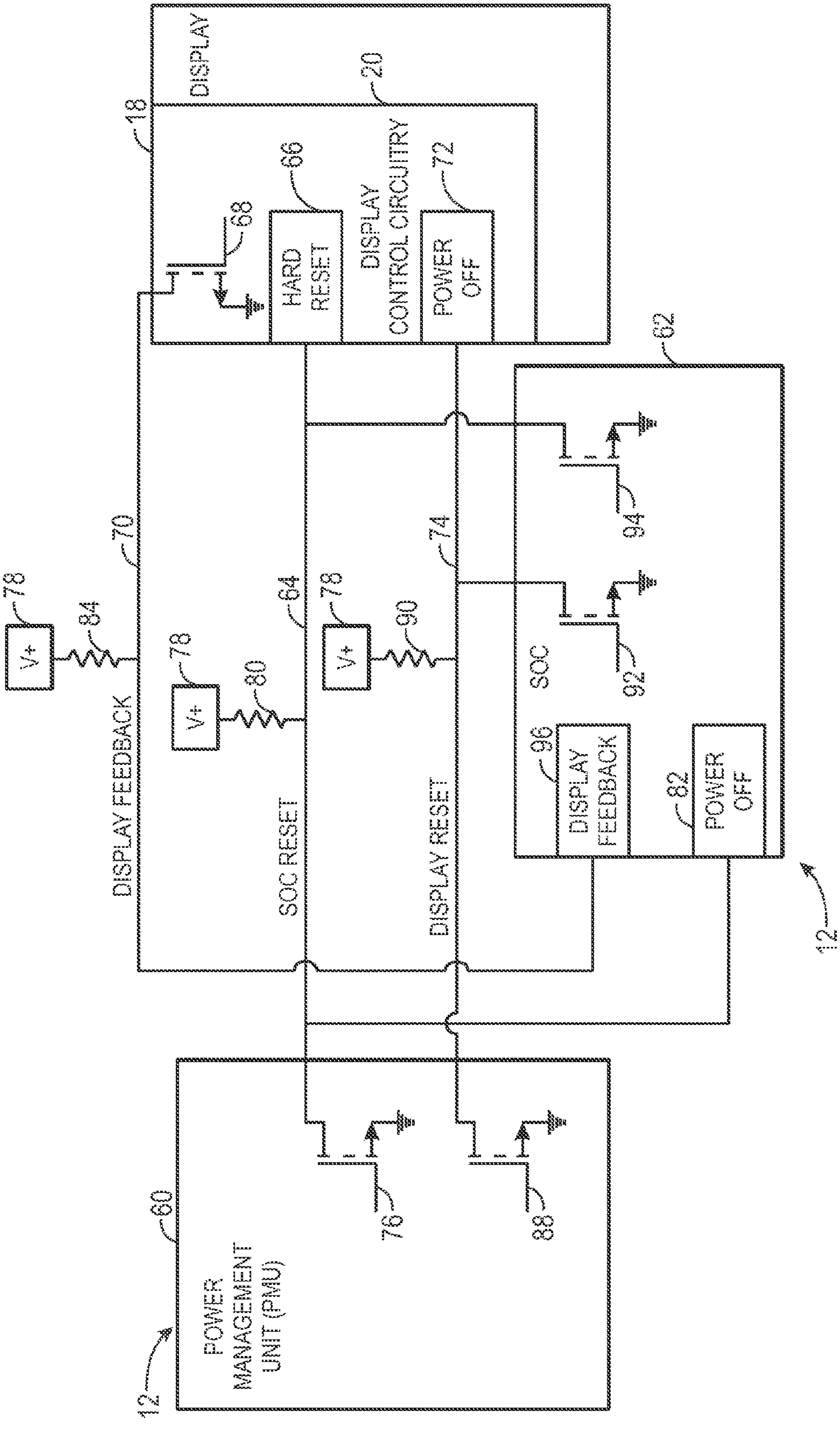
FIG. 5 is a circuit diagram illustrating circuitry of an electronic device used for quick display turn-off controlled by a processor, in accordance with an embodiment.

In certain configurations, the SOC 62 or another processor 12 may be configured to cause the SOC reset signal 64 to be a logical low, resulting in the display 18 receiving an indication at the hard reset input 66 that the display 18 will imminently be powered off. FIG. 5 generally represents one embodiment of a circuit diagram of certain components of the electronic device 10 used for quick display turn-off when controlled by any one of the processors 12. As illustrated, the SOC 62 includes SOC reset output circuitry 94. The SOC reset output circuitry 94 may include a FET as illustrated, or any other suitable output producing device. The default output from the SOC reset output circuitry 94 is a logical high. When the SOC reset output circuitry 94 is activated, the SOC reset signal 64 becomes a logical low.

When the hard reset input 66 receives a logical low SOC reset signal 64, the display control circuitry 20 causes data to be discharged from the pixels of the display 18. After the display control circuitry 20 has caused the data to be discharged from the pixels of the display 18, the display control circuitry 20 may activate the feedback output circuitry 68. When the feedback output circuitry 68 is activated, the display feedback signal 70 becomes a logical low.

The SOC 62 includes a display feedback input 96 that receives the display feedback signal 70. When the SOC 62 receives a logical low display feedback signal 70, the SOC 62 has a confirmation that the display 18 has caused the pixels of the display 18 to be discharged. The SOC 62 includes the display reset output circuitry 92 which may be activated after the logical low display feedback signal 70 is received. In certain embodiments, the SOC 62 may activate the display reset output circuitry 92 only after receiving the logical low signal at the display feedback input 96; however, in other embodiments, the SOC 62 may activate the display reset output circuitry 92 regardless of whether or not a logical low signal was received by the display feedback input 96. When the display reset output circuitry 92 is activated, the display reset signal 74 becomes a logical low. The power off input 72 of the display control circuitry 20 receives the display reset signal 74. When the power off input 72 receives a logical low display reset signal 74, the display control circuitry 20 has notification that power is about to be removed from the display 18.

Figure 6:
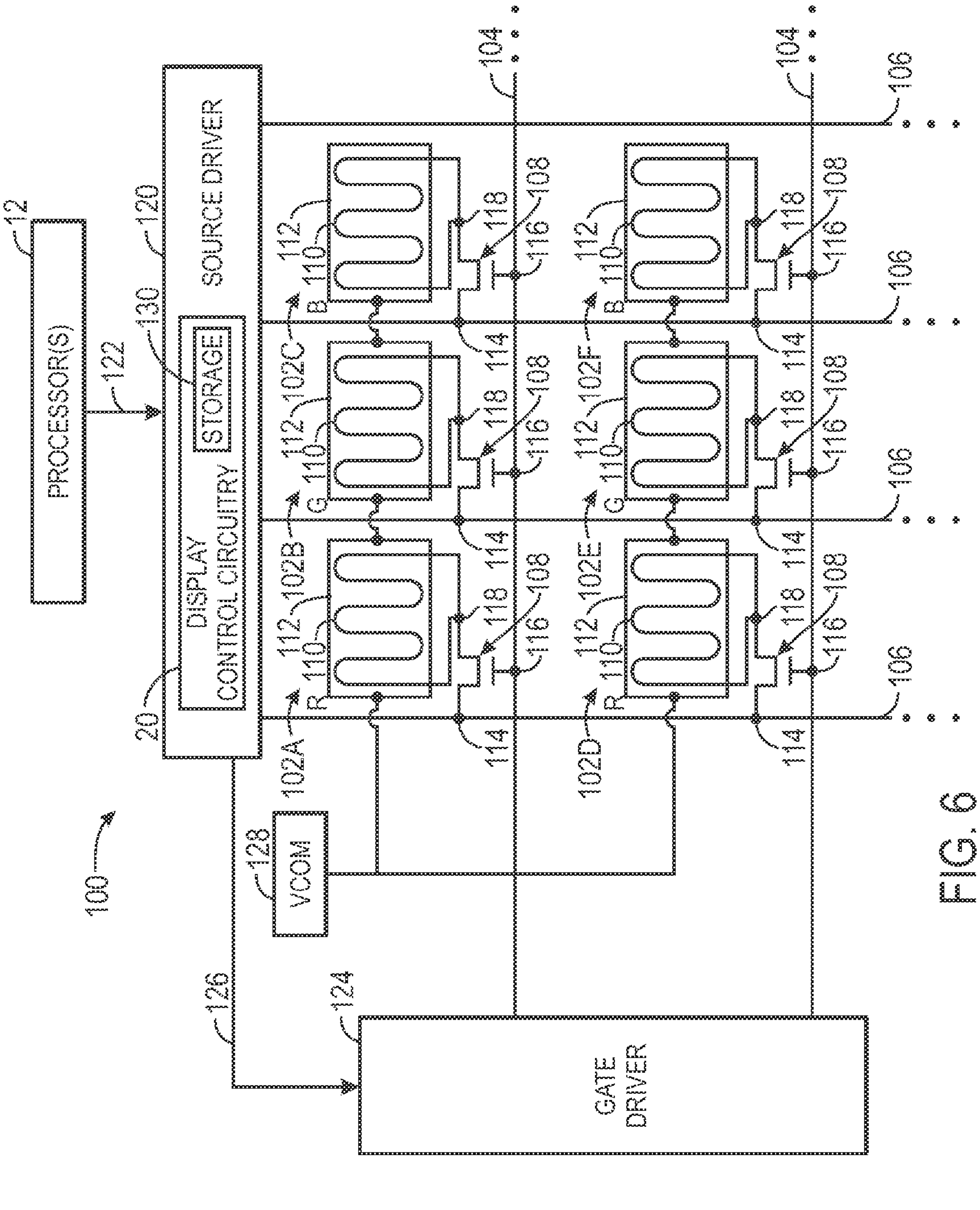
FIG. 6 is a circuit diagram illustrating display circuitry used to discharge pixels of an LCD quickly to reduce the occurrence of image artifacts when the LCD is turned back on, in accordance with an embodiment.

Among the various components of an electronic display 18 may be a pixel array 100, as shown in FIG. 6. As illustrated, FIG. 6 generally represents a circuit diagram of certain components of the display 18 in accordance with an embodiment. In particular, the pixel array 100 of the display 18 may include a number of unit pixels 102 disposed in a pixel array or matrix. In such an array, each unit pixel 102 may be defined by the intersection of rows and columns, represented by gate lines 104 (also referred to as scanning lines), and source lines 106 (also referred to as data lines), respectively. Although only six unit pixels 102, referred to individually by the reference numbers 102A-102F, respectively, are shown for purposes of simplicity, it should be understood that in an actual implementation, each source line 106 and gate line 104 may include hundreds or thousands of such unit pixels 102. Each of the unit pixels 102 may represent one of three subpixels that respectively filters only one color (e.g., red, blue, or green) of light. For purposes of the present disclosure, the terms "pixel," "subpixel," and "unit pixel" may be used largely interchangeably.

In the presently illustrated embodiment, each unit pixel 102 includes a thin film transistor (TFT) 108 for switching a data signal supplied to a respective pixel electrode 110. The potential stored on the pixel electrode 110 relative to a potential of a common electrode 112, which may be shared by other pixels 102, may generate an electrical field sufficient to alter the arrangement of a liquid crystal layer of the display 18. In the depicted embodiment of FIG. 6, a source 114 of each TFT 108 may be electrically connected to a source line 106 and a gate 116 of each TFT 108 may be electrically connected to a gate line 104. A drain 118 of each TFT 108 may be electrically connected to a respective pixel electrode 110. Each TFT 108 may serve as a switching element that may be activated and deactivated (e.g., turned on and off) for a period of time based on the respective presence or absence of a scanning or activation signal on the gate lines 104 that are applied to the gates 116 of the TFTs 108.

When activated, a TFT 108 may store the image signals received via the respective source line 106 as a charge upon its corresponding pixel electrode 110. As noted above, the image signals stored by the pixel electrode 110 may be used to generate an electrical field between the respective pixel electrode 110 and a common electrode 112. This electrical field may align the liquid crystal molecules within the liquid crystal layer to modulate light transmission through the pixel 102. Thus, as the electrical field changes, the amount of light passing through the pixel 102 may increase or decrease. In general, light may pass through the unit pixel 102 at an intensity corresponding to the applied voltage from the source line 106.

The display 18 also may include a source driver integrated circuit (IC) 120, which may include a processor, microcontroller, or application specific integrated circuit (ASIC), that controls the display pixel array 100 by receiving image data 122 from the processor(s) 12 and sending corresponding image signals to the unit pixels 102 of the pixel array 100. It should be understood that the source driver 120 may be a chip-on-glass (COG) component on a TFT glass substrate, a component of a display flexible printed circuit (FPC), and/or a component of a printed circuit board (PCB) that is connected to the TFT glass substrate via the display FPC. Further, the source driver 120 may include any suitable article of manufacture having one or more tangible, computer-readable media for storing instructions that may be executed by the source driver 120. In addition, the source driver 120 may include the display control circuitry 20.

The source driver 120 also may couple to a gate driver integrated circuit (IC) 124 that may activate or deactivate rows of unit pixels 102 via the gate lines 104. As such, the source driver 120 may provide timing signals 126 to the gate driver 124 to facilitate the activation/deactivation of individual rows (i.e., lines) of pixels 102. In other embodiments, timing information may be provided to the gate driver 124 in some other manner. The display 18 may include a Vcom source 128 to provide a Vcom output to the common electrodes 112. In some embodiments, the Vcom source 128 may supply a different Vcom to different common electrodes 112 at different times. In other embodiments, the common electrodes 112 all may be maintained at the same potential (e.g., a ground potential) while the display 18 is on.

When pixel electrodes 110 are not discharged before the display 18 is turned off, a bias voltage may remain on the pixel electrodes 110. It is believed that this bias voltage could affect the liquid crystal, creating image artifacts on the display 18 for a long time (e.g., several minutes) after the display 18 is turned back on. Accordingly, the display control circuitry 20 is used to quickly discharge the pixel electrodes 110 before the display 18 is turned off to inhibit image artifacts from appearing on the display 18, such as when the display 18 is turned on after previously being turned off. As a result of discharging the pixel electrodes 110, the bias voltage on the pixel electrodes 110 when the display 18 is turned off may be low, or near zero. In certain embodiments, the display control circuitry 20 may store instructions to be used for quickly discharging the pixel electrodes 110 in a storage device 130. As may be appreciated, the storage device 130 may be any suitable article of manufacture having a tangible, computer-readable media for storing instructions for the display control circuitry 20. For example, the storage device 130 may be an EEPROM device. It should be noted that when the display control circuitry 20 is used to quickly discharge the pixel electrodes 110, the display 18 does not display the image data 122 (e.g., the display 18 ignores or disregards image data 122 sent from the processor(s) 12). Furthermore, in some embodiments, discharging the pixel electrodes 110 is one way of causing a frame of pixel data originating from the display 18 to be stored in the pixels 102.

Figure 7:
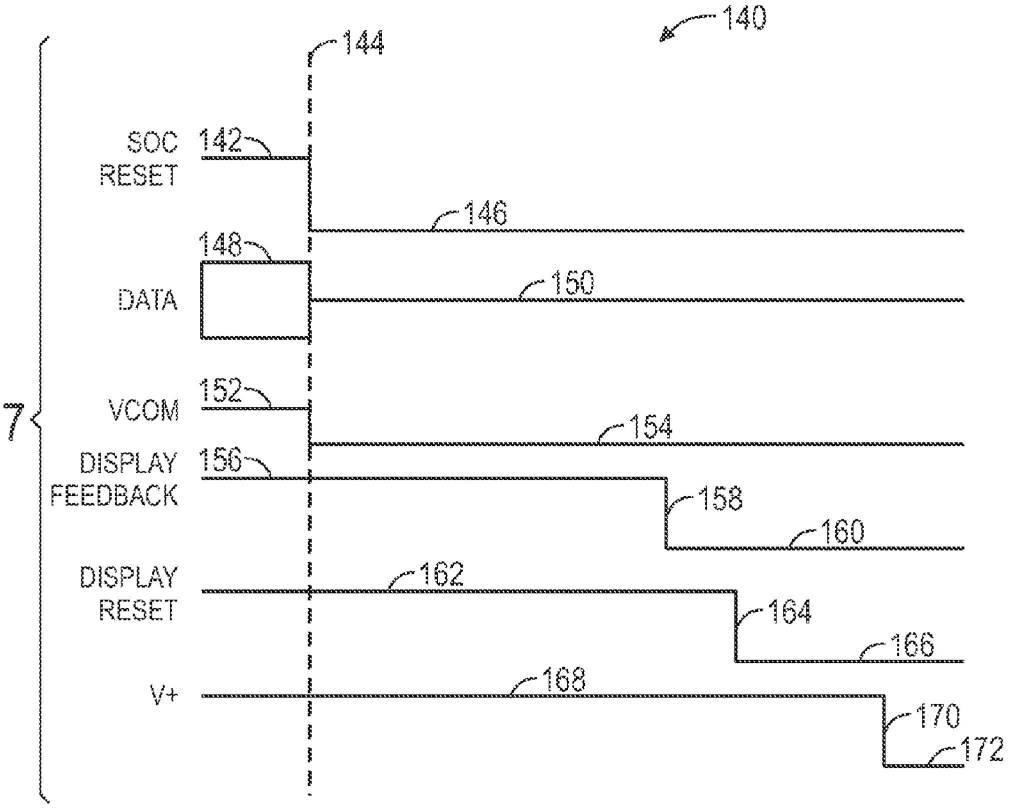
FIG. 7 is a timing diagram illustrating a turn-off sequence used for fast display turn-off, in accordance with an embodiment.

In some examples, the power management unit 60 or the SOC 62 may communicate with the display control circuitry 20 prior to powering off the display 18 so the display 18 can be prepared for a fast turn-off. FIG. 7 illustrates one embodiment of a timing diagram 140 that shows the timing of the signals for fast display 18 turn-off. In certain embodiments, the SOC reset signal is active-high during normal operation of the display 18, as shown by segment 142. At a time 144, the power management unit 60, the SOC 62, or another processor 12, activates the SOC reset signal causing a logical low signal to be supplied to the display control circuitry 20, as shown by segment 146. The SOC reset signal instructs the display control circuitry 20 that power will be imminently removed from the display 18. For example, power may be removed from the display 18 after the display 18 has sufficient time to discharge the pixels 102 of the display 18 (e.g., sufficient time to cause a frame of pixel data to be stored in the pixels 102).

In the illustrated embodiment, pixel data is applied to the pixels 102 during segment 148 until the SOC reset signal is activated at time 144. At time 144, the display control circuitry 20 causes pixel data applied to the pixels 102 to remain constant throughout segment 150. For example, the display control circuitry 20 may cause the pixel data applied to the pixels 102 to be zero volts, a black voltage, a Vcom voltage, a near-zero voltage, a low voltage, and so forth. The Vcom signal operates at a normal operating voltage during segment 152 until the SOC reset signal is activated at time 144. At time 144, the display control circuitry 20 causes the Vcom signal to be a fixed voltage that remains throughout segment 154, such as zero volts, a low voltage, or another suitable voltage. It should be noted that, in certain embodiments, the pixel data at segment 150 and the VCOM signal at 154 may be substantially the same voltage. As such, after time 144, the display control circuitry 20 applies the pixel data and the Vcom signal to pixels 102 of the display 18 to discharge the pixels 102 (e.g., the display control circuitry 20 may apply a ground signal, a low voltage, near-zero voltage, black voltage, or zero volts across the pixel electrodes 110 of the display 18). It should be noted that a “black” voltage may be a voltage that produces a dark pixel (e.g., the darkest pixel voltage). In some embodiments, the pixel data applied to the pixels 102 of the display 18 may be considered a “frame” of pixel data.

The display feedback is used by the display 18 to inform the power management unit 60, the SOC 62, or another processor 12 that a frame of pixel data has been stored in the pixels 102 of the display 18 (e.g., that the pixels 102 have been discharged). In the present embodiment, the display feedback signal is active-high and remains at a logical high throughout segment 156. At a time 158, the display feedback signal changes to a logical low for the duration of segment 160. The display feedback signal provided at the time 158 gives an indication that a frame of pixel data has been stored in the display 18 and that the display 18 is ready to be powered off. As may be appreciated, the length of time between the indication that power will be removed from the display at time 144 and providing the display feedback signal at time 158 may vary between different embodiments. For example, in certain embodiments, time 158 may be approximately 16 ms, 20 ms, 30 ms, 36 ms, or 50 ms after time 144. In some embodiments, the time between times 144 and 158 may be substantially the time it takes for the display control circuitry 20 to store a frame of pixel data in the pixels 102 of the display 18. In other embodiments, the time between times 144 and 158 may be associated with the refresh rate of the electronic display during normal operation (e.g., at a refresh rate of approximately 60 Hz, the time between times 144 and 158 may be approximately 16 ms).

The power management unit 60, the SOC 62, or another processor 12 sends a display reset signal to the display control circuitry 20 to begin power removal from the display 18. As illustrated, in some embodiments, the display reset signal is active-high, as shown by segment 162. When the display reset signal is activated at a time 164, the display reset signal changes to a logical low where it remains throughout segment 166. As may be appreciated, the length of time between time 158 and time 164 may be any suitable time. For example, in certain embodiments, the time between 158 and 164 may be approximately 2 ms, 4 ms, 8 ms, 10 ms, and so forth.

The voltage V+ is an example of one power signal that may be supplied to the display 18. The voltage V+ is supplied to the display 18 throughout segment 168. At a time 170, the voltage V+ is reduced to approximately zero volts through segment 172 where power is removed from the display 18 (e.g., display is shut down, powered off, etc.). The length of time between time 164 where the display reset signal is received by the display 18 and time 170 where the voltage V+ is reduced may be any suitable time. For example, in certain embodiments the length of time between time 164 and time 170 may be approximately 5 ms, 10 ms, 16 ms, 32 ms, and so forth. As will be appreciated, the length of time between time 164 and time 170 may be associated with a length of time it takes to discharge power supplies providing power to the display 18. Using such a method 140 as discussed herein, the display 18 may discharge the pixels 102 of the display 18 quickly after receiving notification that power will be removed from the display 18.

Figure 8:
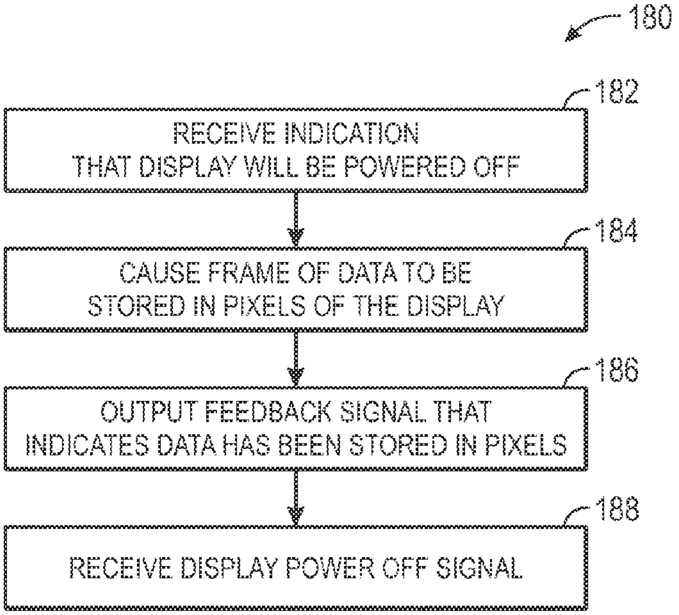
FIG. 8 is a flowchart describing a method for fast display turn-off of an electronic display, in accordance with an embodiment.

As presented above, the display 18 is shut down using a series of operations that may inhibit image artifacts from appearing when the display 18 is subsequently turned back on. FIG. 8 illustrates one embodiment of a method 180 for discharging pixels 102 of the display 18 before power is removed from the display 18. At block 182, the display control circuitry 20 receives an indication from the power management unit 60, the SOC 62, or another processor 12 that the display 18 will soon be powered off. Then, at block 184, the display control circuitry 20 causes a frame of pixel data originating from the display 18 to be stored in pixels 102 of the display 18. At block 186, the display control circuitry 20 outputs a feedback signal indicating that the frame of pixel data has been stored in pixels 102 of the display 18. Next, at block 188, the display control circuitry 20 receives a power off signal from the power management unit 60, the SOC 62, or another processor 12 to power off the display 18. Thus, using such a method, pixels 102 of the display 18 may be quickly discharged before power is removed from the display 18. Furthermore, using the method 180 image artifacts may be inhibited from occurring on the display 18.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for preparing an electronic display of an electronic device to be turned off comprising:

receiving at the electronic display an indication of an imminent electronic display reset signal from a power management unit, a processor, or some combination thereof indicating the electronic display will be powered off within a period of time;

in response to the indication of an imminent electronic display reset signal, causing a frame of pixel data originating from the electronic display to be stored in pixels of the electronic display before the electronic display is powered off to inhibit image artifacts from occurring on the electronic display when the electronic display is powered back on in the future;

outputting a feedback signal from the electronic display to a component of the electronic device after the frame of pixel data is stored in the pixels of the electronic display, wherein the feedback signal indicates that the electronic display may be powered down without a residual bias voltage on the pixels of the electronic display; and receiving an electronic display reset signal from the power management unit, the processor, or some combination thereof of an electronic display reset before the electronic display is forced off.

2. The method of claim 1, wherein the frame of pixel data produces a voltage difference between pixel electrodes and common electrodes substantially equal to ground.

3. The method of claim 1, wherein the frame of pixel data produces a voltage difference between pixel electrodes and common electrodes substantially equal to a darkest pixel value achieved during normal electronic display operation.

4. The method of claim 1, wherein the electronic display is powered off after a sufficient time has elapsed for discharging power supplied to the electronic display.

5. An electronic display, comprising:

a plurality of pixels; and display control circuitry configured to receive power from a power management unit external to the electronic display, to cause the plurality of pixels to be discharged after receiving an indication of an imminent reset signal of the electronic display from the power management unit, a processor, or some combination thereof, to send a feedback signal to the power management unit indicating that the plurality of pixels are discharged, and to receive an electronic display reset signal from the power management unit, the processor, or some combination thereof before the electronic display is forced off.

6. The electronic display of claim 5, wherein the display control circuitry is configured to cause the plurality of pixels to be discharged substantially within a period of time associated with a refresh rate of the electronic display during normal operation.

7. An electronic device comprising:

a power management unit configured to manage power of the electronic device;

an electronic display configured, after receiving an indication of an imminent electronic display reset signal from the power management unit, the processor, or some combination thereof, to cause a frame of pixel data to be stored in pixels of the electronic display before power is removed from the electronic display by the power management unit, to inhibit image artifacts from occurring when the electronic display is powered on at a later time; and a processor configured to send image data to the electronic display;

wherein the electronic display is configured to ignore the image data from the processor after receiving the indication of the imminent electronic display reset and to output a feedback signal to the power management unit indicating that the electronic display may be powered down without a residual bias voltage on the pixels of the electronic display; and wherein the power management unit is configured to power off the electronic display after sending an electronic display reset signal.

8. The electronic device of claim 7, wherein the electronic display is configured to cause the frame of pixel data to be stored in pixels of the electronic display within approximately 16 ms when the electronic display normally operates at approximately 60 Hz.

9. The electronic device of claim 7, wherein the electronic display is configured to receive an electronic display reset signal within substantially 36 ms after receiving the indication of the imminent electronic display reset.

10. The electronic device of claim 7, wherein the power management unit is configured to power off the electronic display substantially within a period of time associated with discharging power supplied to the electronic display.

11. The electronic device of claim 7, wherein the electronic display is configured to send a feedback signal to the power management unit after the frame of pixel data is stored in the pixels of the electronic display.

12. The electronic device of claim 11, wherein the electronic display is configured to send the feedback signal substantially within a period of time associated with a refresh rate of the electronic display during normal operation.

13. The electronic device of claim 11, wherein the electronic display is configured to receive an electronic display reset signal from the power management unit after sending the feedback signal.

14. A method comprising:

causing a frame of pixel data to be stored in pixels of an electronic display after the electronic display receives an imminent electronic display reset signal indicating that the electronic display is about to be powered off, wherein the frame of pixel data originates from the electronic display;

outputting a feedback signal from the electronic display after the frame of pixel data is stored in the pixels of the electronic display, wherein the feedback signal is output to a power management unit, a processor, or some combination thereof and wherein the feedback signal indicates that the electronic display may be powered down without a residual bias voltage on the pixels of the electronic display; and receiving an electronic display reset signal from the power management unit, the processor, or some combination thereof, after outputting the feedback signal, to power off the electronic display to limit image artifacts from occurring on the electronic display when the electronic display is powered back on at a later time.

15. An electronic device comprising:

a power management unit configured to control power applied within the electronic device;

a processor configured to control operation of the electronic device; and an electronic display configured to stop displaying image data and to discharge pixel data from pixels of the electronic display after receiving an indication that an imminent electronic display reset signal is about to occur, wherein the indication is received from the power management unit, the processor, or some combination thereof, wherein the electronic display is configured to output a feedback signal to the power management unit after the pixel data is discharged from the pixels of the electronic display, wherein the feedback signal indicates that the electronic display may be powered down without a residual bias voltage on the pixels of the electronic display;

wherein the power management unit is configured to power off the electronic display after sending an electronic display reset signal.

16. The electronic device of claim 15, wherein the indication that the electronic display reset is about to occur is received from the power management unit.

17. The electronic device of claim 15, wherein the indication that the electronic display reset is about to occur is received from the processor.

* * * * *